UNITED STATES PATENT OFFICE.

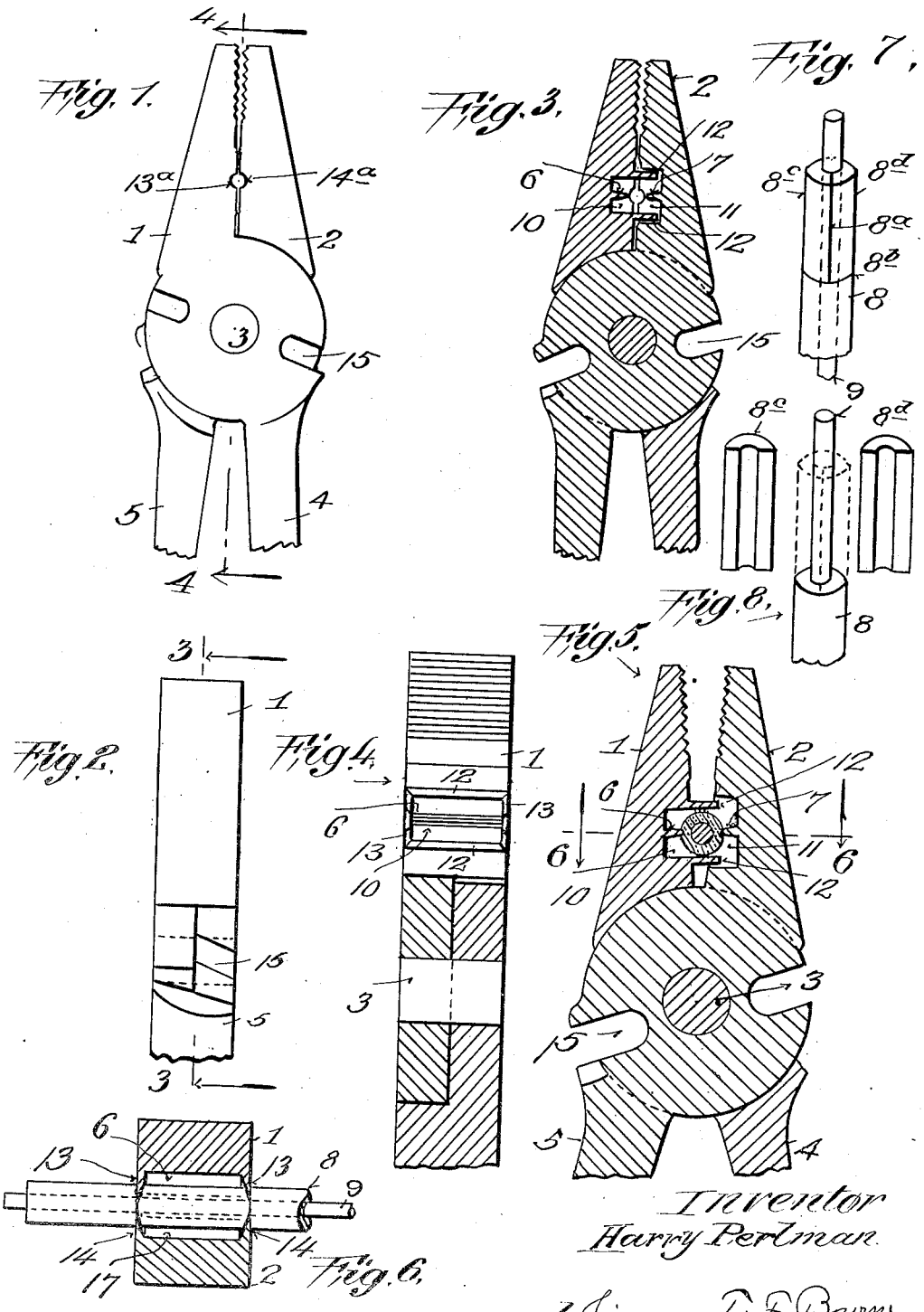

HARRY PERLMAN, OF NEW YORK, N. Y.

PLIERS FOR CUTTING INSULATION.

1,406,486.  Specification of Letters Patent.  Patented Feb. 14, 1922.

Application filed April 20, 1920. Serial No. 375,268.

*To all whom it may concern:*

Be it known that I, HARRY PERLMAN, a citizen of the United States, and resident of New York, in the county of Kings and State of New York, have invented certain new and useful Improvements in Pliers for Cutting Insulation, of which the following is a specification.

The object of my invention is to provide simple and efficient means to cut insulation on electric wires to permit the ready removal of the insulation from the wire.

I have illustrated my improvement in connection with the jaws of a pair of pliers comprising transverse opposing blades along the inner sides of the jaws to sever the insulation on a wire in a longitudinal direction and cutters on the sides of the jaws to sever the insulation transversely, whereby a section of the insulation may be readily removed from the wire.

My invention also comprises novel details of improvement that will be more fully hereinafter set forth and then pointed out in the claims.

Reference is had to the accompanying drawings forming part hereof wherein

Figure 1 is a side view of a portion of a pair of pliers embodying my invention;
Fig. 2 is an edge view thereof;

Fig. 3 is a section on the line 3, 3 in Fig. 2;

Fig. 4 is a section on the line 4, 4 in Fig. 1;

Fig. 5 is an enlarged section similar to Fig. 3 showing the jaws and blades separated;

Fig. 6 is a section on the line 6, 6 in Fig. 5;

Fig. 7 is a detail illustrating insulation severed on a wire, and

Fig. 8 illustrates the severed insulation removed from the wire.

Similar numerals of reference indicate corresponding parts in the several views.

The numerals 1, 2 indicate opposing jaws of a pair of pliers joined by the pivot 3 and having suitable handle members 4, 5, which may be similar to ordinary pliers. The jaw 1 has a transverse blade 6 opposing a transverse blade 7 on jaw 2 to receive and sever between them insulation 8 on a wire 9. The blade 6 is shown located in a recess 10 in the inner side of jaw 1, and blade 7 is shown located in a recess 11 in the inner side of jaw 2 opposing the recess 10. The jaw 1 is provided with spaced guides 12 on opposite sides of blade 6 and adapted to enter recess 11. The guides 12 extend across jaw 1 parallel to blade 6 and retain insulation 8 in position between blades 6 and 7. Jaw 1 has cutters 13 on opposite sides at the ends of blade 6, and jaw 2 has cutters 14 on opposite sides opposing the cutters 13 to sever insulation 8 transversely. The cutters 13, 14 have opposing recesses 13$^a$, 14$^a$ to receive wire 9 so as not to sever the same when the insulation is being cut. The blades and cutters as well as guides 12 may be formed integral with the jaws or may by applied thereto in any desired way.

When insulation 8 is to be removed from the wire the jaws are spread apart, the wire is inserted between the jaws with the insulation between the blades and the guides 12, at the place where the insulation is to be removed from the wire. The jaws are then forced together to cause the blades to cut into the insulation in a longitudinal direction at 8$^a$, on opposite sides of the insulation, the latter entering the recesses 10, 11, and the opposing cutters 13, 14 sever the insulation transversely or around the wire at 8$^b$ (Fig. 7). The cut or severed portions 8$^c$, 8$^d$ of the insulation may be readily stripped from the wire, leaving a desired portion thereof exposed for making connections, etc. The cutting edges of blades 6, 7 are so spaced apart when the jaws are closed that said blades will not sever the wire but will pierce the insulation. The cutting edges of blades 6, 7 preferably approximate the surfaces at the bottoms of the respective recesses 13$^a$, 14$^a$ of side cutters 13, 14.

In the example illustrated the outer parts of the jaws may be used as usual with pliers for gripping articles, and wire cutters may be provided at 15 in an ordinary manner.

My improvements are simple and efficient in operation, and may be operated expeditiously in the manner of using pliers without danger of injuring the wire when severing the insulation.

Changes may be made in the details of construction set forth, within the scope of the appended claims without departing from the spirit of my invention.

Having thus described my invention, what I claim and desire to secure by Letters Patent is:—

1. A pair of relatively movable jaws pivoted together, one of said jaws having a transverse blade to sever insulation in a longitudinal direction on a wire between said jaws, and guides for the insulation on opposite sides of said blade and extending beyond the cutting edge of the blade to guide the insulation to the blade.

2. A pair of relatively movable jaws pivoted together, one of said jaws having a transverse blade to sever insulation in a longitudinal direction on a wire between said jaws, and guides for the insulation on opposite sides of said blade, said guides extending beyond the cutting edge of the blade, the opposing jaw having a recess to receive said guides.

3. A pair of relatively movable jaws pivoted together, opposing blades disposed transversely on said jaws, guides on opposite sides of one blade to retain insulation on a wire between said blades, said guides extending beyond said blade, the jaw opposing said guides having a recess to receive the latter, the blade on said jaw being within said recess.

4. A pair of relatively movable jaws pivoted together, opposing blades disposed transversely on said jaws, said jaws having opposing recesses receiving the respective blades to receive insulation on a wire, one of said jaws having guides spaced on opposite sides of its blade to retain said insulation between the blades, said guides extending beyond said blade, the opposing jaw having a recess to receive said guides.

Signed at New York in the county of New York and State of New York this 16th day of April, A. D. 1920.

HARRY PERLMAN.